(12) United States Patent  (10) Patent No.: US 8,453,776 B2
Neilson  (45) Date of Patent: Jun. 4, 2013

(54) TRAPEZOIDAL COOLING PACKAGE

(75) Inventor: Ryan R. Neilson, Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/219,772

(22) Filed: Aug. 29, 2011

(65) Prior Publication Data

US 2013/0048396 A1 Feb. 28, 2013

(51) Int. Cl.
*B60K 11/00* (2006.01)
*B60K 11/04* (2006.01)

(52) U.S. Cl.
USPC .................................. 180/68.1; 180/68.4

(58) Field of Classification Search
USPC ....... 180/69.2, 68.1, 68.2, 68.4, 68.5; 165/41, 165/96
See application file for complete search history.

(56) References Cited

U.S. PATENT DOCUMENTS 7,128,178 B1 * 10/2006 Heinle et al. ................. 180/68.4

* cited by examiner

*Primary Examiner* — John Walters
*Assistant Examiner* — James Triggs
(74) *Attorney, Agent, or Firm* — Faegre Baker Daniels LLP

(57) ABSTRACT

A vehicle is provided having at least one swing-out cooling assembly. A method of assembling the at least one swing-out cooling assembly on the vehicle is further provided.

18 Claims, 8 Drawing Sheets

TRAPEZOIDAL COOLING PACKAGE

BACKGROUND AND SUMMARY OF THE DISCLOSURE

The present disclosure relates generally to a vehicle having a cooling system and, more particularly, to a vehicle including a swing-out cooling system having an overhead shape that approximates a trapezoid.

Typically, engine systems for both highway and off-highway vehicles include a cooling unit, or heat exchanger, capable of cooling the engine cooling fluid (e.g., coolant), transmission oil, engine oil, etc. For off-highway vehicles, the cooling system may include multiple cooling units in a compact configuration in order to minimize any impact on the size and weight of the vehicle. Additionally, by providing a compact cooling system, there are less constraints on the operator when servicing the vehicle. As such, stacked cooling units are known to provide a compact cooling system for off-highway vehicles.

Over time, cooling units may accumulate debris from the air and the road which decreases the efficiency of the cooling system. Therefore, the cooling units require periodic cleaning and maintenance. However, the stacked cooling unit configuration may make it difficult to clean both sides of the cooling units and may further limit access to the engine.

Some cooling units may fold out from the vehicle in order to provide access to both sides of the cooling unit and the engine. However, such cooling units may rotate or fold out horizontally, thereby requiring the operator to either reach across the cooling unit to access the engine or support the cooling unit above the operator. Furthermore, it may be necessary to use tools to rotate the cooling unit, thereby making removal or rotation of the cooling unit cumbersome and time-consuming.

Similarly, spacing and sizing concerns regarding the cooling unit are provided by the limited space within the housing of the vehicle. Thus, while larger parts such as the heat exchangers and fans can provide increased cooling, the size of such pieces is restricted by the housing of the vehicle.

An illustrative embodiment of the present disclosure includes a vehicle having a chassis; a plurality of ground-engaging members operably coupled to the chassis; an engine supported by the chassis and cooperating with the plurality of ground-engaging members to move the vehicle; and at least one cooling assembly positioned adjacent to the engine. The at least one cooling assembly including a first cooling panel; a second cooling panel, the first and second cooling panels being configured to receive a fluid; and a fan configured to direct air across the cooling panels to cool the fluid. The cooling assembly defines an interior volume defined by six walls wherein the fan is disposed in a first wall, the first cooling panel is disposed on a second wall, and the second cooling panel is disposed on a third wall. Each of the first, second, and third walls define first, second, and third planes, respectively, that intersect each other at non-right angles.

Another illustrative embodiment of the present disclosure includes a vehicle having a chassis; a plurality of ground-engaging members operably coupled to the chassis; an engine compartment coupled to the chassis and housing an engine; and at least one cooling assembly coupled to the engine and located within a cowling space within a cowling that substantially surrounds the cooling assembly. The cooling assembly includes an air propelling member, a first cooler, and a second cooler. The first and second coolers are configured to receive a fluid. The first cooler is mounted on a first wall defining a first plane and the second cooler is mounted on a second wall defining a second plane. The first and second planes intersect along a line that is outside of the cowling space.

The present disclosure further includes a method of assembling a cooling system on a vehicle. The method including the steps of assembling six planar walls where first and second walls define planes that intersect, third and fourth walls are parallel to each other, and fifth and sixth walls are parallel to each other, the six walls cooperating to define an interior volume; positioning first and second heat exchangers on the first and second walls; and coupling a fan to one of the walls.

Additional features and advantages of the present invention will become apparent to those skilled in the art upon consideration of the following detailed description of the illustrative embodiment exemplifying the best mode of carrying out the disclosure as presently perceived.

BRIEF DESCRIPTION OF THE DRAWINGS

The foregoing aspects and many of the intended advantages of this disclosure will become more readily appreciated as the same becomes better understood by reference to the following detailed description when taken in conjunction with the accompanying drawings.

Figure 1:
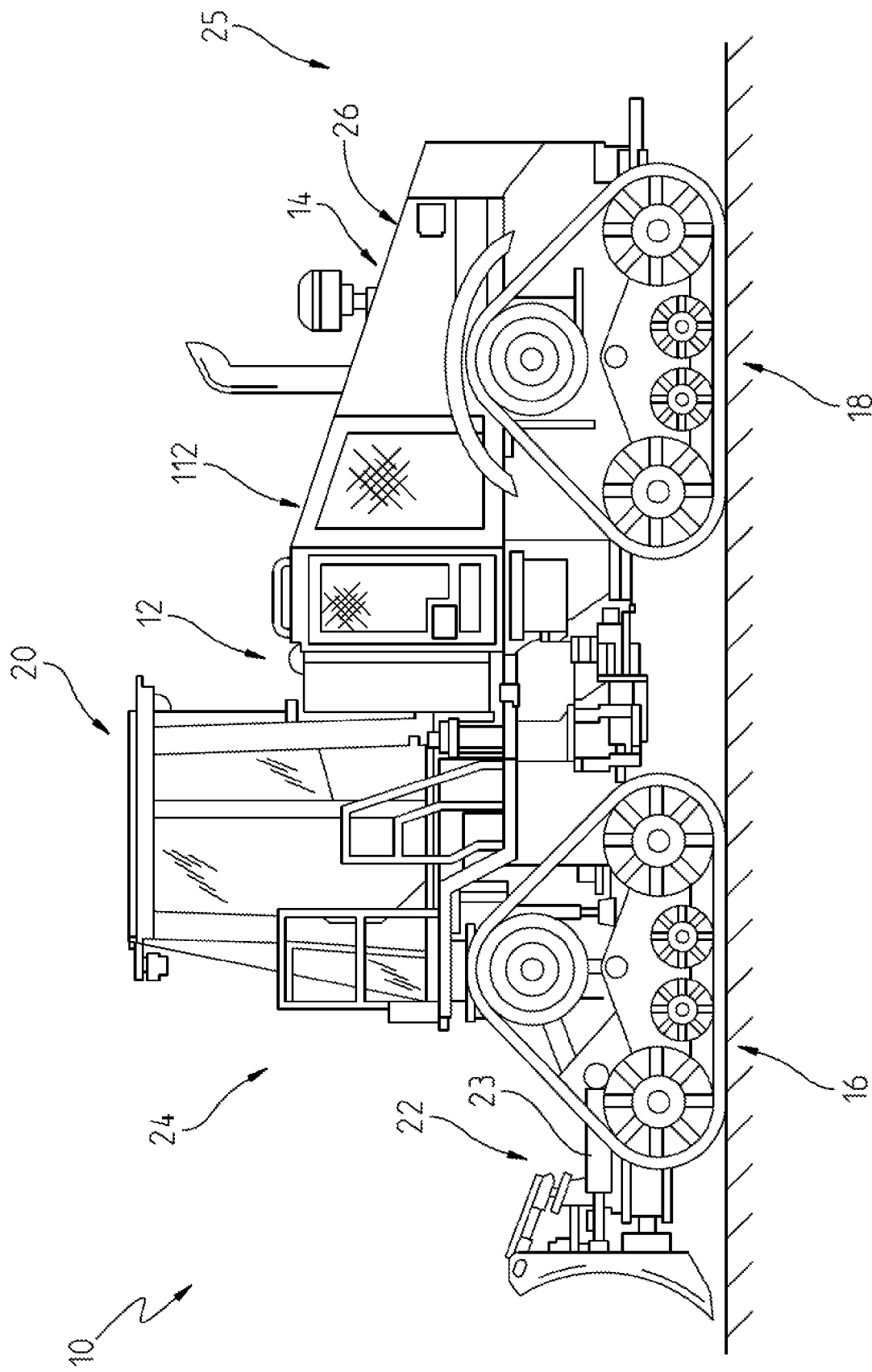
FIG. 1 is a side elevational view of a vehicle, illustratively, a bulldozer.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Figure 2:
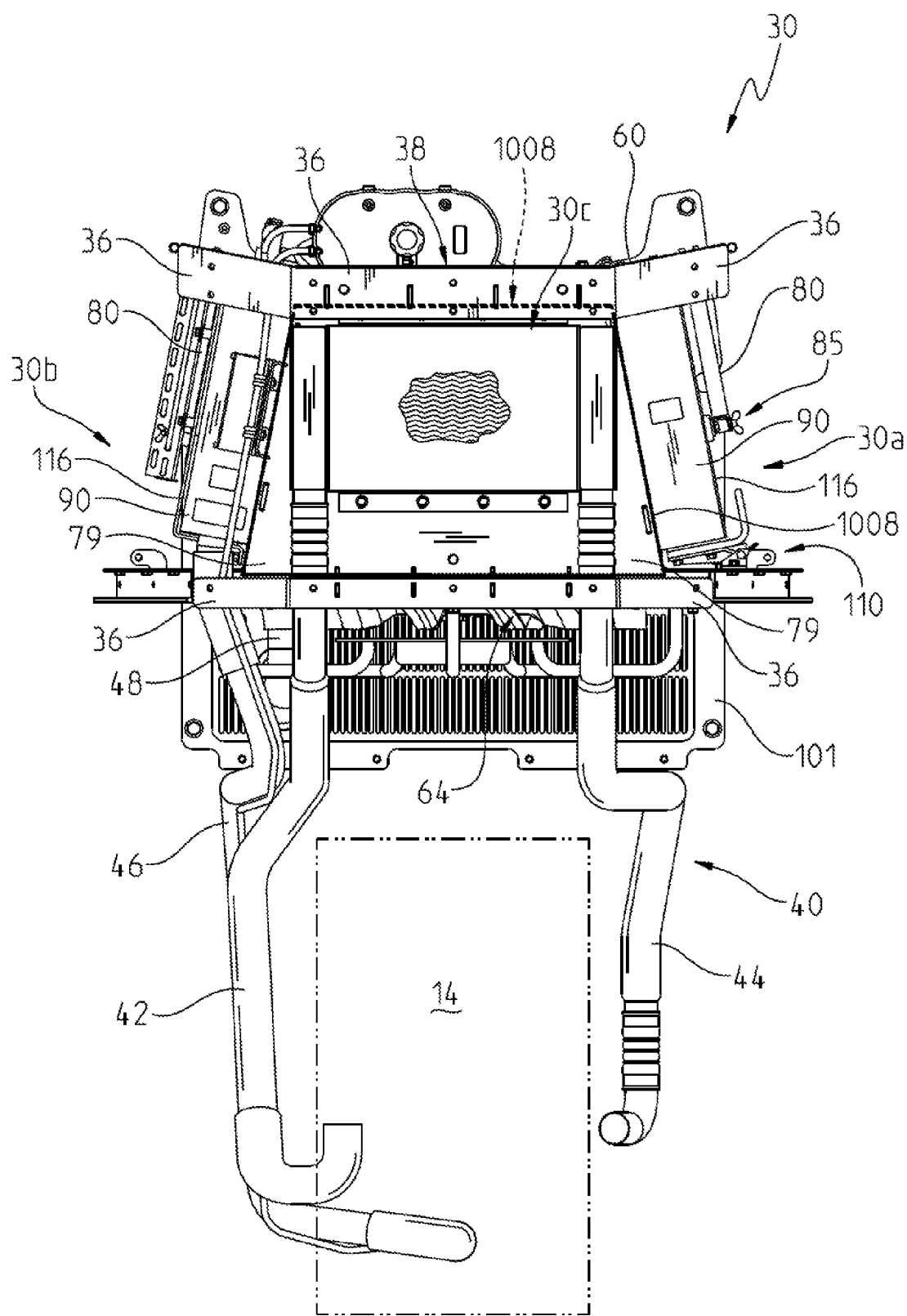
FIGS. 2 & 2A are top plan views of a cooling system of the bulldozer of FIG. 1.
Figure 3:
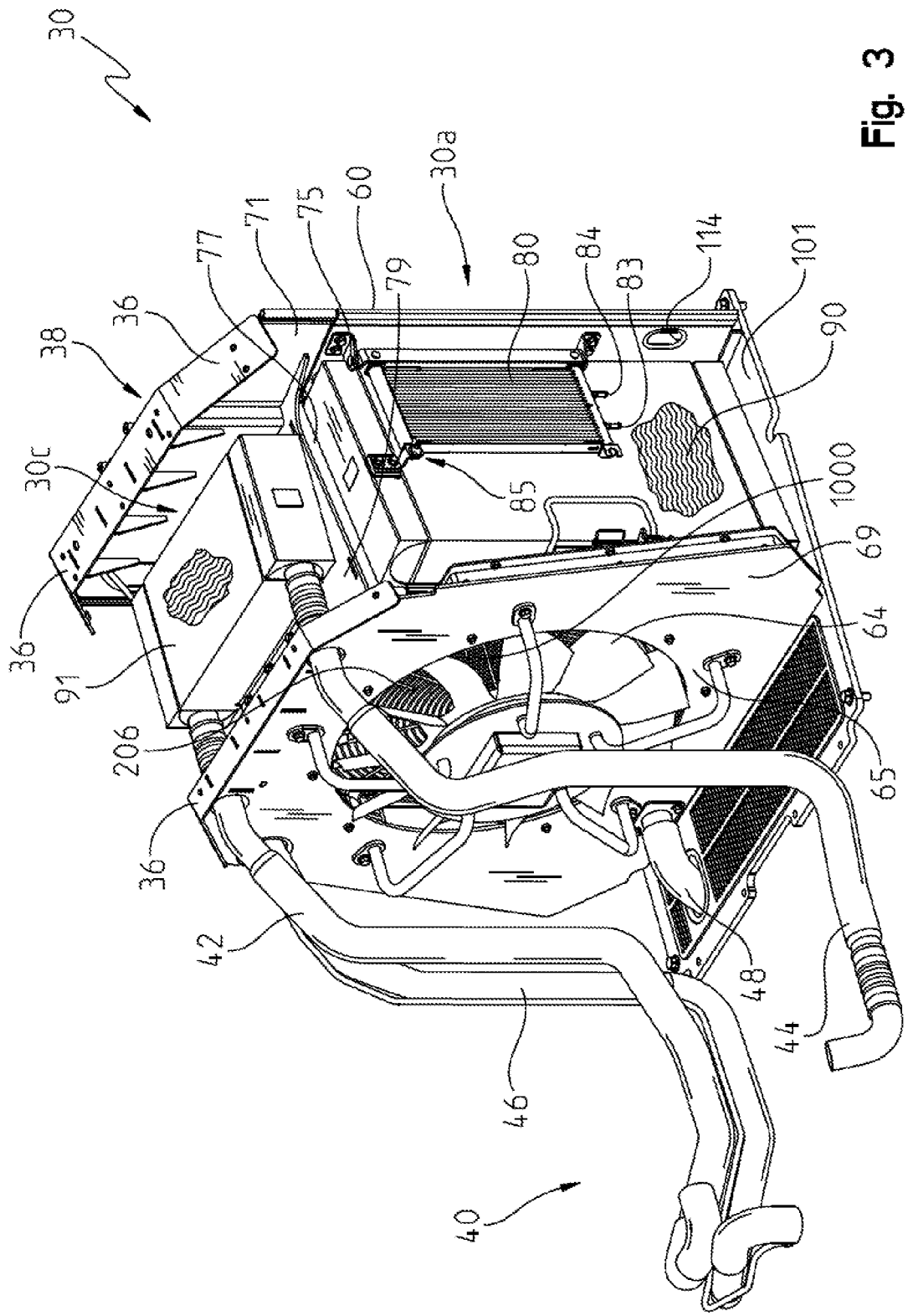
FIG. 3 is a perspective view of the cooling system of FIG. 2.
Figure 4:
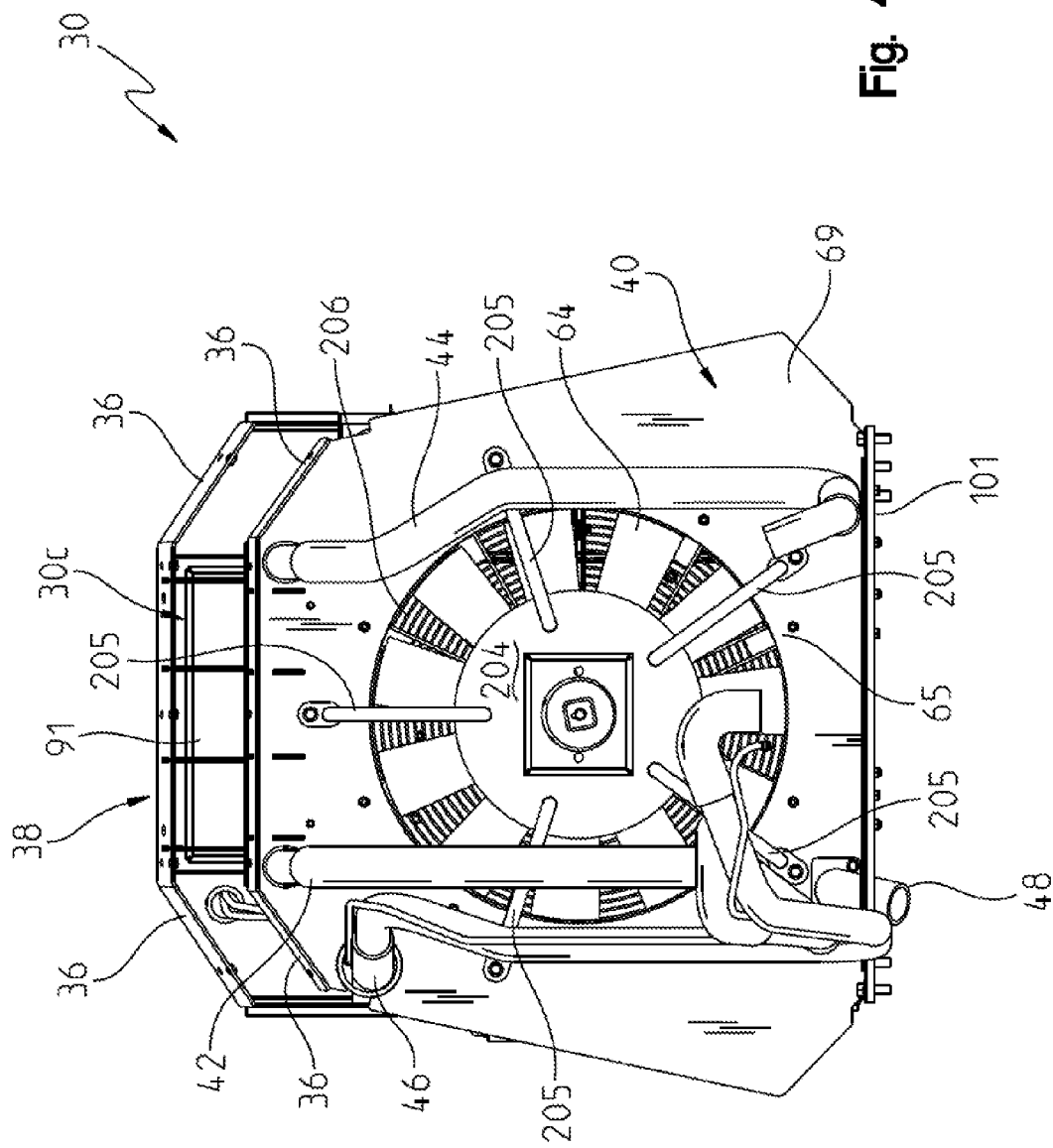
FIG. 4 is a rear plan view of the cooling system of FIG. 2.
Figure 5:
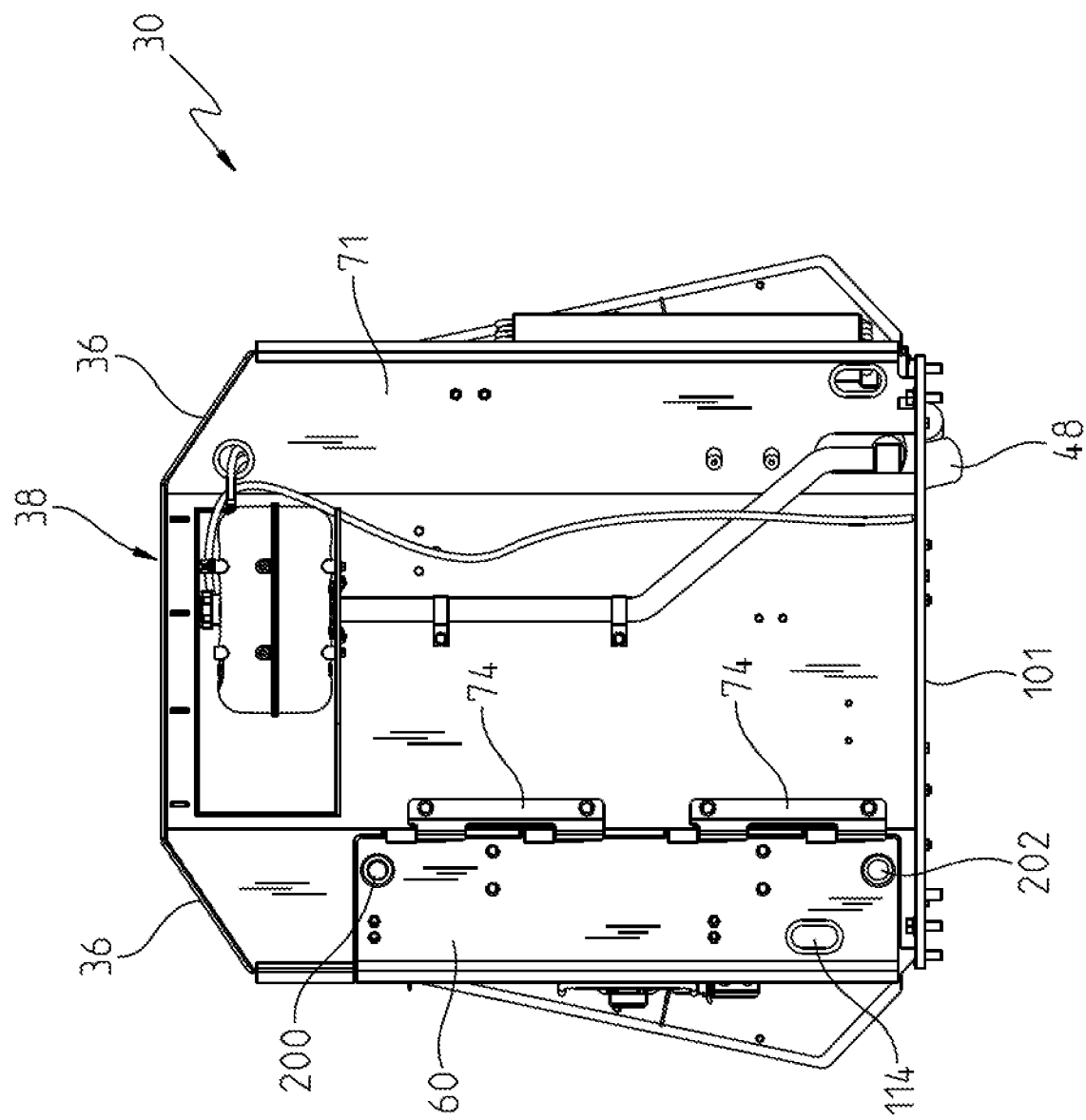
FIG. 5 is a front plan view of the cooling system of FIG. 2.

Referring to FIGS. 1-3, a construction or engineering vehicle is provided in the form of an articulated bulldozer 10. Although the vehicle is illustrated and described herein as bulldozer 10, the vehicle may be in the form of a tractor, a dump truck, a motor grader, an excavator, a crawler, or another agricultural or utility vehicle, for example. Bulldozer 10 includes a chassis 12, an engine 14, and a ground-engaging mechanism, illustratively, front tracks 16 and rear tracks 18. It is also within the scope of the present disclosure that the ground-engaging mechanism of bulldozer 10 may include wheels, for example. In use, engine 14, in cooperation with a transmission (not shown), drives front tracks 16 and rear tracks 18, causing bulldozer 10 to propel across the ground. Engine 14 may be a combustion engine or an electric engine including an electric generator and at least one electric motor. For example, the electric generator and electric motor may cooperate with engine 14 and the ground-engaging mechanism to move bulldozer 10.

Bulldozer 10 of FIG. 1 also includes an operator cab 20 coupled to chassis 12 to house and protect the operator of bulldozer 10. Operator cab 20 may include foot pedals, a steering wheel, joysticks, monitors, and other controls (not shown) for articulated bulldozer 10.

The illustrative embodiment of bulldozer 10 of FIG. 1 further includes a work tool in the form of an articulating blade 22. Other vehicles contemplated in this disclosure may include suitable work tools, such as a dump or haul body, forks, tillers, and mowers. Articulating blade 22 is moveably coupled to chassis 12 for pushing and/or clearing dirt and other materials. At least one hydraulic cylinder 23 may be provided to operate articulating blade 22. The operator may control the movement of articulating blade 22 using joysticks or other controls located within operator cab 20.

FIG. 1 further shows a front end 24 and back end 25 of bulldozer 10. Front end 24 includes operator cab 20 and front tracks 16. Back end 25 includes an engine compartment 26 and rear tracks 18. Alternative embodiments of the vehicle may be configured to support engine compartment 26 forward of operator cab 20. Engine compartment 26 may be supported by chassis 12 and comprised of a plurality of support members forming a frame (not shown). Engine compartment 26 houses the transmission, engine 14, and at least one heat exchanger, shown as a cooling system 30. Cooling system 30 is located within and adjacent to cowling section 112 of bulldozer 10.

Illustratively, engine 14 cooperates with cooling system 30 to decrease the temperature of fluids, such as transmission oil, hydraulic oil, turbo-charged air, axle oil, and/or cooling fluid (e.g., coolant). As such, cooling system 30 prevents engine 14 from overheating during operation of bulldozer 10.

As shown in FIGS. 2-5, cooling system 30 includes frame assembly 38, cooler assemblies 30a-c, fan 64, and hoses 42, 44, 46, 48 (additional hoses present but not shown). Frame assembly 38 includes front panel 71, rear panel 69, left panel 73, right panel 77, top panel 79, and bottom panel 101. Panels 71, 69, 73, 77, 79, 101 cooperate to define interior volume 1000. The walls of interior volume 1000 defined by top panel 79 and bottom panel 101 form equilateral trapezoids. Front wall of interior volume 1000, formed by front panel 71, is rectangular and is smaller than the back wall of interior volume 1000, formed by rear panel 69. Right and left walls of interior volume 1000 are formed by panels 73, 77 and are also rectangular. Accordingly, as viewed from above (FIG. 2) interior volume 1000 has a trapezoidal cross section (outline noted as 1008). Interior volume 1000 forms a trapezoidal prism. Top panel 79 forms a 90 degree angle with each of front 71, rear 69, left 73, and right panel 77. Bottom panel 101 likewise forms a 90 degree angle with each of front 71, rear 69, left 73, and right panel 77. The sum of the angles between front 71, rear 69, left 73, and right panel 77 is 360. Right panel 77 forms an acute angle with rear panel 69 and an obtuse angle with front panel 71. Left panel 73 forms an acute angle with rear panel 69 and an obtuse angle with front panel 71.

Frame assembly 38 further includes mounting flanges 36 for mounting to the frame of vehicle 10 and for mounting bodywork thereto. Each of top panel 79, left panel 73, and right panel 77 have large, substantially rectangular openings therein. Cooler assemblies 30a, 30b, 30c are each mounted over one of the substantially rectangular openings in the panels 79, 73, 77.

Cooler assemblies 30a, 30b, 30c include many similar features and as such, like features are identified with like reference numerals herein. Additionally, any reference and description provided for one of cooler assemblies 30a, 30b, 30c may be understood to be applicable to the other of cooler assemblies 30a, 30b, 30c, unless otherwise specified.

Referring to FIG. 2, a top view of cooling system 30 is shown. Illustratively, cooler assemblies 30a, 30b are positioned along exterior sides of frame assembly 38. Cooling assembly 30c is positioned on a top side of frame assembly 38. Cooler assembly 30a is illustratively shown along a right side 32 of bulldozer 10 and cooler assembly 30b is illustratively shown along a left side 34 of bulldozer 10, where "right" and "left" are taken from the perspective of the operator inside operator cab 20. However, cooler assemblies 30a, 30b, 30c may be configured along other sides of engine compartment 26, for example, cooler assemblies 30a, 30b, 30c may be coupled to front panel 71 or bottom panel 101.

FIG. 3 shows cooler assembly 30a of cooling system 30. Illustratively, cooler assembly 30a includes hinged door 60, outer cooling panel 80, inner cooling panel 90, and lock 110. Outer cooling panel 80 and inner cooling panel 90 are coupled to hinged door 60. Hinged door 60 is hinged via first hinge 74 relative to front panel 71 to allow outer cooling panel 80 and inner cooling panel 90 to rotate outwardly relative to frame assembly 38. Door 60 provides access to interior volume 1000. Lock 110 includes a portion coupled to inner cooling panel 90 and a portion coupled to frame assembly 38. Outer cooling panel 80 is further hingedly attached to hinged door 60 such that outer cooling panel 80 can rotate out and away from inner cooling panel 90.

Figure 6:
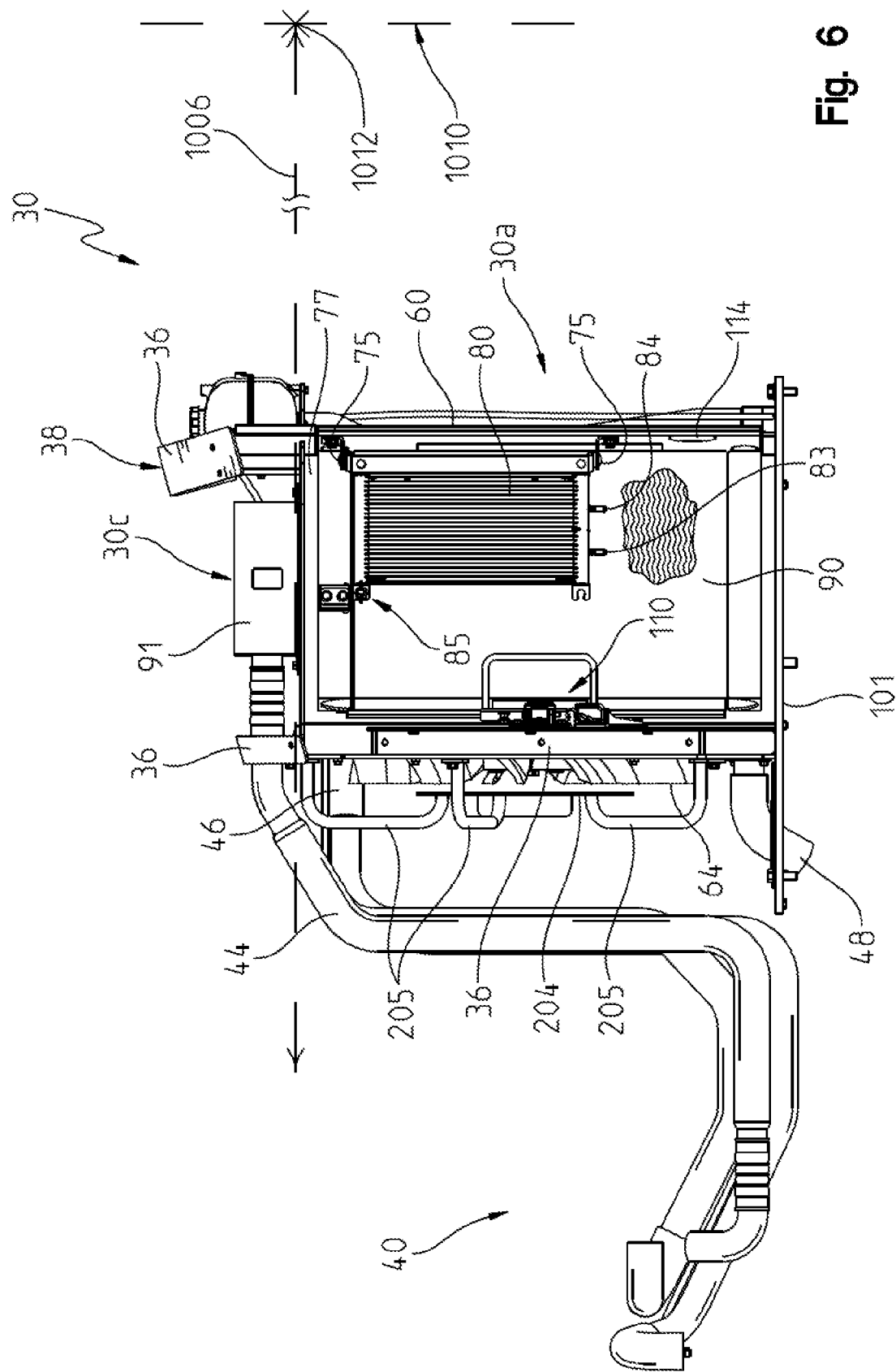
FIG. 6 is a side plan view of the cooling system of FIG. 2.

Cooler assembly 30b also includes an outer cooling panel 80, and an inner cooling panel 90, as shown in FIGS. 2 & 6. While left side inner cooling panel 90 is shown as being fixed relative to frame assembly 38, embodiments are envisioned where left side inner cooling panel 90 is also hingedly attached to frame assembly 38. Left side outer cooling panel 80 is hingedly attached to frame assembly 38.

Cooling assembly 30c illustratively includes a single cooling panel 91. Cooler assemblies 30a, 30b, 30c may include more or less than two cooling panels, or heat exchangers, depending on the size and configuration of bulldozer 10. Exemplary cooling panels 80, 90 are in a parallel, stacked arrangement to accommodate the limited space available in engine compartment 26 of bulldozer 10. Each panel 90, 91 is illustratively rectangular and generally defines an abutment plane 1002 (FIG. 2a), 1004 (FIG. 2a), 1006 (FIG. 6) along which each panel 90, 91 abuts frame assembly 38. Planes 1002, 1004 intersect at a vertical line 1010 in front of cooling system 30. Similarly, all three planes 1002, 1004, 1006 intersect at a point 1012 in front of cooling system 30.

Additionally, inner panel 90 is intermediate outer panel 80 and an air propelling mechanism, illustratively a fan 64. Fan 64 is generally adjacent rear panel 69 which forms shroud 65. Fan 64 includes a hydraulic motor (not shown). Fan 64, outer panel 80, and inner panel 90 each are positioned within engine compartment 26. Illustratively, inner panel 90 represents the heat exchanger nearest to engine 14.

Cooling system 30 is coupled to a plumbing assembly 40 in order to regulate the temperature of engine 14. As with other conventional vehicle plumbing assemblies, plumbing assembly 40 includes hoses, tubing, fluid lines, pipes, pumps, controls, monitors, and/or sensors to regulate the flow and temperature of fluids within engine compartment 26. Illustratively, plumbing assembly 40 includes a plurality of hoses 42, 44, coupled to cooling assembly 30c, a plurality of hoses 46, 48, coupled to cooler assembly 30b, and a plurality of hoses (not shown, but which would couple via ports 200, 202 in hinged door 60), coupled to cooler assembly 30a. Hoses (not shown) are additionally coupled to outer panels 90. Hoses 42, 44, 46, 48 are illustratively comprised of a flexible material for transporting the fluids (e.g., coolant, hydraulic oil, transmission oil, and/or turbo-charged air) between cooler assemblies 30a,b,c and the transmission, a hydraulic pump (not shown), and/or engine 14 during operation of bulldozer 10.

Figure 2A:
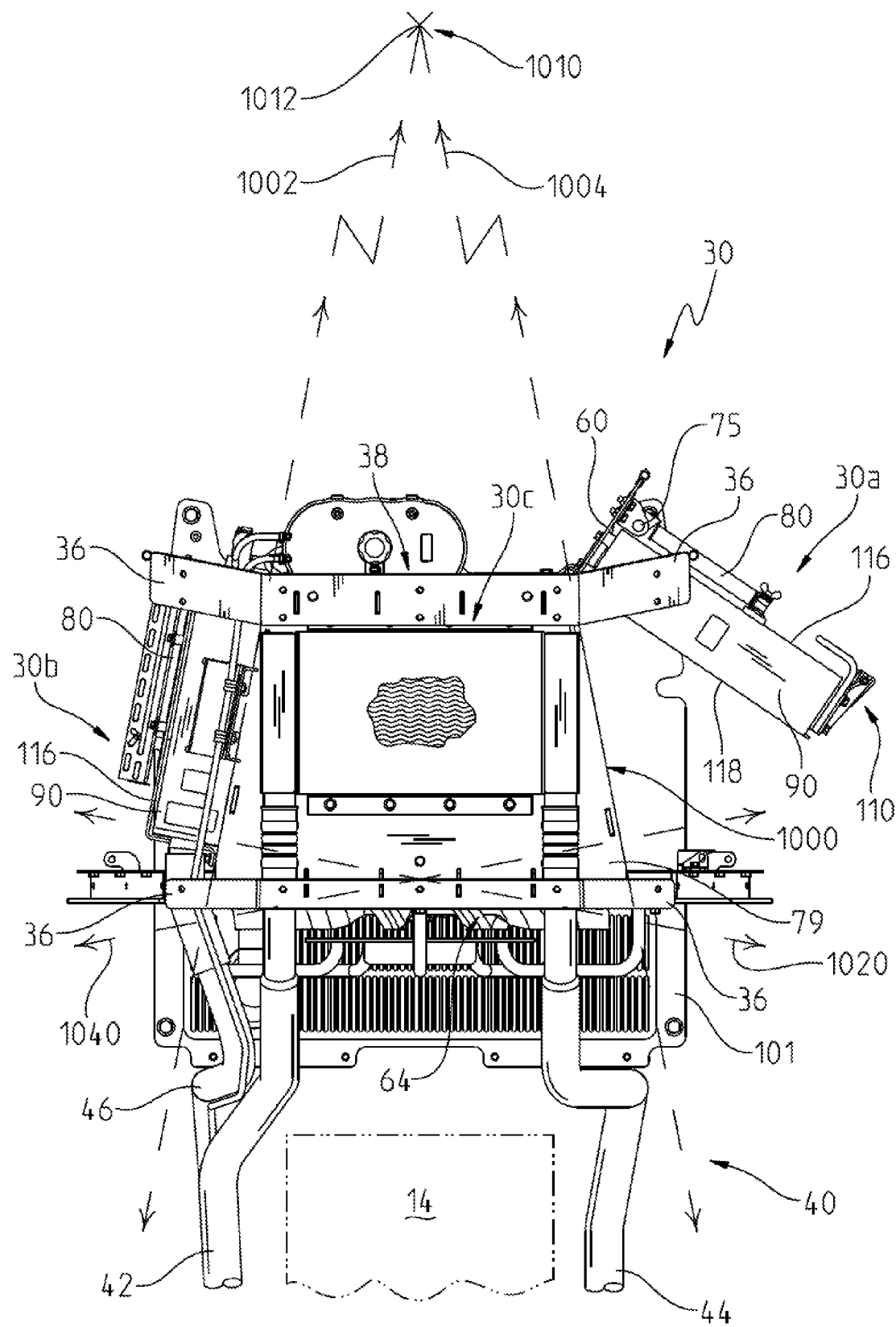

Referring to FIG. 2a, cooler assembly 30a is shown having door 60, inner cooling panel 90, and outer cooling panel 80 pivoted away from frame assembly 38. Such open orientation allows servicing of cooling system 30.

Fan 64 further assists the flow of air between cooler assembly 30a and the outside environment. Fan 64 is coupled to rear panel 69 using conventional fasteners or couplers, such as bolts, screws, welds, rivets, or adhesive. While the exemplary embodiment of the air propelling mechanism is fan 64, other blowers, vent systems, or air flow devices known in the industry may be used. Fan 64 is mounted via center plate 204 held in place via brackets 205. Cage 206 is further mounted proximate fan 64 within interior volume 1000. Rotation of fan 64 pulls air from interior volume 1000. Accordingly, air is pulled through panels 80, 90, 91. It should be appreciated that the angles of left panel 73 and right panel 77 allow a more direct direction of flow for air coming through inner cooling panels 90 and past fan 64 through shroud 65. Indeed, a straight line of travel 1020, 1040 can be drawn perpendicular to both abutment plane 1002 and abutment plane 1004 that also passes through shroud 65. Such geometry produces less restriction and increase flow relative to inner cooling panel 90 that are oriented perpendicularly to shroud 65.

Figure 7:
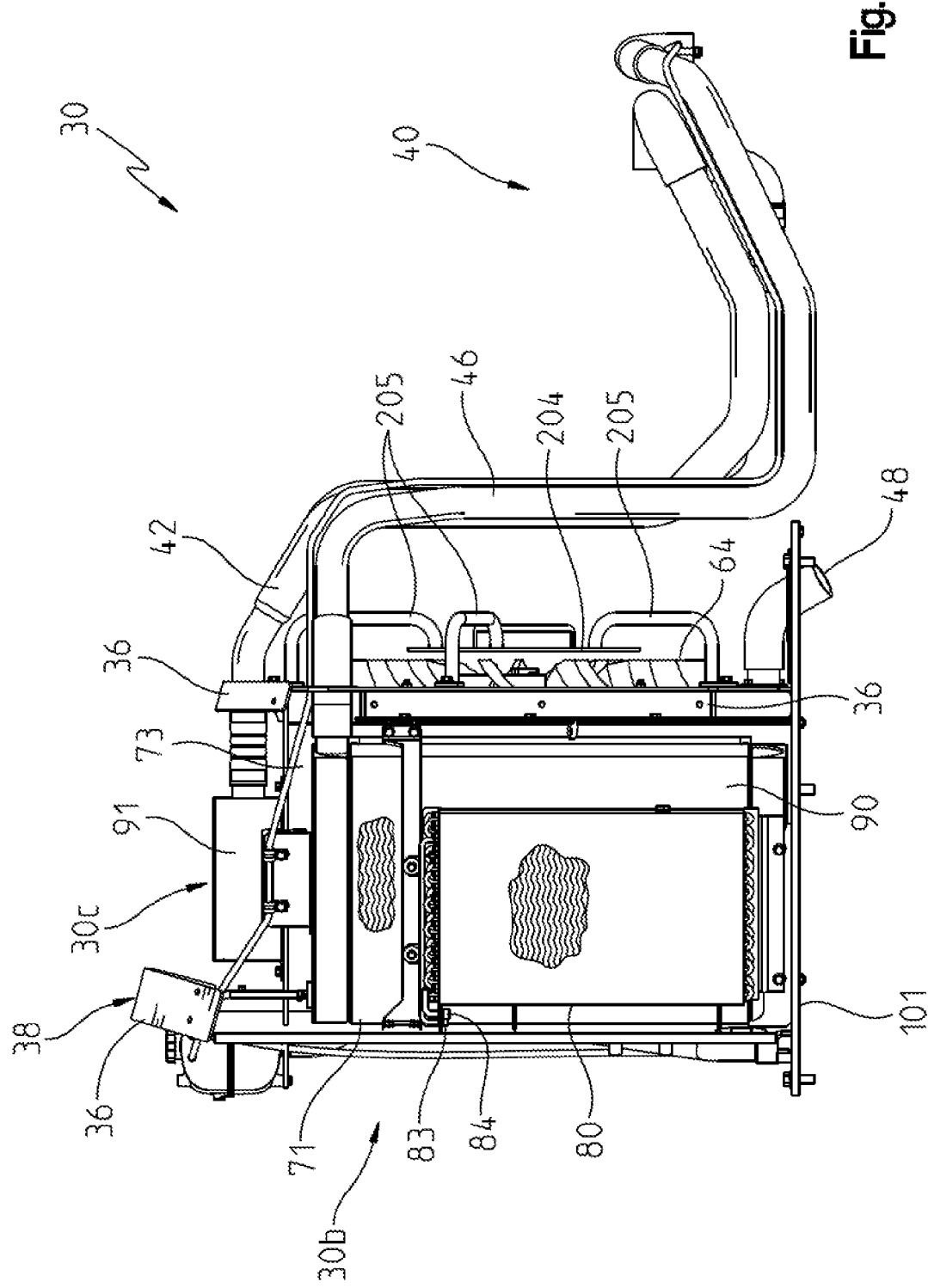
FIG. 7 is a side plan view of the cooling system of FIG. 2.

Each outer cooling panel 80 may be vented with air passageways to accommodate air flow through outer cooling panel 80. Outer panel 80 embodies a heat exchanging mechanism configured to cooperate with hoses (not shown) of plumbing assembly 40. Illustratively, outer panel 80 of cooler assembly 30a includes an inlet 83 and an outlet 84 (FIG. 3) in fluid communication with hoses that are routed through opening 114 to cool engine coolant in order to prevent engine 14 from overheating. Inlet 83 is positioned adjacent outlet 84 along a bottom edge of outer panel 80 in order to couple with a hose. Likewise, outlet 84 couples to a hose. Hoses are coupled to inlet 83 and outlet 84 with conventional couplers (e.g., fasteners, clamps, clips, hose fittings, adhesive). At the opposite side of engine compartment 26 (FIG. 7), outer panel 80 of cooler assembly 30b mirrors outer panel 80 of cooler assembly 30a and also includes an inlet 83 and an outlet 84 for receiving, cooling, and transporting engine coolant. As with outer panel 80 of cooler assembly 30a, conventional couplers may be used to couple hose ends with inlet 83 and outlet 84. Outer panel 80 of each cooler assembly 30a, 30b may include an arrangement of tubes or passageways through which the fluids may travel in order to transfer heat from the fluid to cooler assemblies 30a, 30b, thereby reducing the temperature of the fluid. Each outer panel 80 may be any conventional cooling panel or cooling mechanism, for example, a radiator.

Inner panels 90, having outer sides 116 and inner sides 118, are positioned adjacent to and coupled to frame assembly 38. As with outer panel 80, inner panel 90 of each cooler assembly 30a, 30b, and panel 91 of cooling assembly 30c exemplifies a heat exchanger and may include a series of tubes or passageways through which the fluids may pass in order to transfer heat from the fluids to panel 90, 91. Additionally, each cooling panel 90, 91 may be vented with air passageways like outer cooling panel 80 to accommodate air flow through cooling panel 90, 91. As such, panel 90, 91 is configured to decrease the temperature of the fluids. For example, panels 90, 91 operate as a conventional vehicle radiator to prevent engine 14 from overheating.

Cooling panels 90, 91 of cooler assemblies 30a-c are fluidly coupled to plumbing assembly 40 through hoses 42, 44, 46, 48 (as well as others not shown). Panels 90, 91 may be divided into one or more compartments or chambers, each receiving a distinct fluid for cooling engine 14 or another component of bulldozer 10. Each chamber includes an inlet and an outlet for transporting engine cooling fluid, transmission oil, hydraulic oil, axle oil, and/or turbo-charged air.

Additionally, other chambers or compartments (not shown) may be coupled to panels 90, 91 of each cooler assembly 30a-c. For example, additional chambers may receive air-conditioning refrigerant or diesel fuel. These other chambers may be coupled to inner side 118 of inner panel 90 or may be coupled to the frame assembly 38 of engine compartment 26 and/or chassis 12 with conventional couplers (i.e., bolts, rivets).

Similarly to hinged door 60, outer panel 80 includes a second hinge 75 coupled along a vertical side edge of outer panel 80 near front side 28 of engine compartment 26. Second hinge 75 is further coupled to the frame assembly 38 of engine compartment 26 and/or chassis 12. With second hinge 75, outer panel 80 may pivot about a vertical axis in a manner similar to door 60. Illustratively, vertical axis of second hinge 75 may be spaced apart from vertical axis of first hinge 74 and may be parallel to the vertical axis of the first hinge. Second hinge 75 allows outer panel 80 to pivot or rotate between a "closed" position and an "open" position. When outer panel 80 is parallel to inner panel 90, outer panel 80 is in the closed position and only outer side 81 of outer panel 80 may be exposed. Conversely, the open position is defined when outer panel 80 is pivoted away from inner panel 90. As such, sides of outer panel 80 and outer side 91 of inner panel 90 are exposed. Furthermore, outer panel 80 pivots in the same direction as door 60.

Outer panel 80 of cooler assemblies 30a also includes a coupler, illustratively a latch assembly 85, configured to releasably attach outer panel 80 to inner panel 90. A handle, push button, lever, or other known latching device may be included in latch assembly 85 in order to uncouple outer panel 80 from inner panel 90. Illustratively, latch assembly 85 includes a threaded bolt that is rotatable relative to inner cooling panel 90. The threaded bolt receives a wing-nut thereon. When the wing nut is loosened, the threaded bolt may be rotated out of engagement with outer cooling panel 80, thereby uncoupling outer panel 80 from inner panel 90. Alternatively, fp85 includes a lever that is a handle on which the operator pulls such that the pulling force opens a clamp and releases a lug to uncouple outer panel 80 from inner panel 90. When it is necessary to couple outer panel 80 with inner panel 90, threaded bolt with the loosened wing-nut is rotated to engage outer cooling panel 80. The wing-nut is then tightened to secure outer cooling panel 80. Additionally, bumpers may be used to further soften the closure of outer panel 80 against inner panel 90. As with lock 110, latch assembly 85 also operates by hand and does not require tools to uncouple outer panel 80 from inner panel 90. Latch assembly 85, may be any conventional, hand-operable latch or coupling device configured to releasably couple outer panel 80 and inner panel 90.

Cooling panels 80, 90 may pivot together when coupled together with latch assembly 85 or may pivot independently of each other outer panel 80 is uncoupled from inner panel 90. If cooling panels 80, 90 pivot together on hinge 74, only outer side 81 of outer panel 80, and inner side 92 of inner panel 90. Inner side 82 of outer panel 80 and outer side 91 of inner panel 90 are not fully visible.

The trapezoidal cross section of interior volume 1000 has a few ramifications with respect to the use of space within engine compartment 26. Front panel 71 is more narrow than rear panel 69. The combination of inner cooling panel 90 and outer cooling panel 80 provides a point of greatest width at the front end of the combination due to the stacked coolers. The more narrow front panel 71 provides that to overall width of cooling system 30 is not greater at the front end of cooling system 30 despite the combination of inner cooling panel 90 and outer cooling panel 80 being wider at the front.

If the width of front panel 71 was also provided to rear panel 69, then as can be seen in FIG. 2, the rear end of inner cooling panel 90 would be located at a point that overlaps with fan 64. Thus, fan 64 would need to be moved fully out of interior volume 1000, or a smaller fan would need to be used. Moving fan 64 out of interior volume 1000 would increase the front-to-back length of cooling system 30. Additionally, if the same sized fan 64 was kept, such a combination with a smaller rear panel would result in fan oversweep relative to shroud 65 (portions of the fan being radially outside of the aperture in shroud 65). A shroud 65 of lesser size than fan 64 reduces the air throughput capability of fan 64. Similarly, a smaller fan 64 also has a smaller throughput capability relative to a larger fan. Accordingly, the trapezoidal orientation of frame assembly 38 and interior volume 1000 allows for increased air throughput while maintaining a smaller front panel 71 to accommodate added width from stacked outer cooling panel 80 on outer cooling panel 80.

With reference to FIG. 2a, in operation, when it is necessary to clean, repair, or maintain cooling system 30, the operator may pivot at least a portion of cooling system 30 to the "open" position. Specifically, door 60 may be pivoted from the closed position to the open position. The operator may operate lock 110 by hand. With lock 110 released, hinge 74 of door 60 may pivot to expose inner side 92 of fp90 of fp30a, fan 64, inner side 92 of fp30b, and inner side 92 of fp30c for cleaning or repair. If it is necessary to clean or maintain inner side 82 of outer panel 80 or outer side 91 of inner panel 90, outer panel 80 may be uncoupled from inner panel 90 using latch assembly 85. The illustrative embodiment of latch assembly 85 may be operated by hand, rather than with tools.

If it is only necessary to access inner side 92 of inner panel 90, engine 14, or engine compartment 26, outer panel 80 may remain coupled to inner panel 90 with latch assembly 85 and both cooling panels 80, 90 may pivot together between the closed and open positions.

Hoses 42, 44, 46, 48, the transmission lines, and the axle lines may remain coupled to cooling system 30 when outer panel 80 and inner panel 90 pivot. As such, the fluids do not need to be drained from cooling system 30 prior to pivoting cooling panels 80, 90. Additionally, the flexible nature of hoses 42, 44, 46, 48, the transmission lines, and the axle lines minimizes any frictional resistance at the inlets and the outlets when outer panel 80 and inner panel 90 are opened.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A vehicle including:
  a chassis;
  a plurality of ground-engaging members operably coupled to the chassis;
  an engine supported by the chassis and cooperating with the plurality of ground-engaging members to move the vehicle; and
  at least one cooling assembly positioned adjacent to the engine, the at least one cooling assembly including:
    a first cooling panel;
    a second cooling panel, the first and second cooling panels being configured to receive a fluid; and
    a fan configured to direct air across the cooling panels to cool the fluid, the cooling assembly defining an interior volume defined by six walls wherein the fan is disposed in a first wall, the first cooling panel is disposed on a second wall, and the second cooling panel is disposed on a third wall, each of the first, second, and third walls defining first, second, and third planes, respectively, that intersect each other at non-right angles.

2. The vehicle of claim 1, further including a third cooling panel positioned adjacent to and oriented parallel to the first cooling panel.

3. The vehicle of claim 2, wherein the first cooling panel pivots outwardly about a vertical axis.

4. The vehicle of claim 1, wherein the second and third walls are equally sized and the second and third planes assume identical angles relative to the first plane.

5. The vehicle of claim 4, wherein fourth and fifth walls of the six walls that are identical in size.

6. The vehicle of claim 5, wherein a sixth wall of the six walls is differently sized from all other walls.

7. The vehicle of claim 1, wherein the first wall is differently sized from all other of the six walls.

8. The vehicle of claim 1, wherein the vehicle is a bulldozer.

9. A vehicle including:
  a chassis;
  a plurality of ground-engaging members operably coupled to the chassis;
  an engine compartment coupled to the chassis and housing an engine; and
  at least one cooling assembly coupled to the engine and located within a cowling space within a cowling that substantially surrounds the cooling assembly, the cooling assembly including an air propelling member, a first cooler, and a second cooler, the first and second coolers configured to receive a fluid, the first cooler being mounted on a first wall defining a first plane, the second cooler being mounted on a second wall defining a second plane, the first and second planes intersecting along a line that is outside of the cowling space.

10. The vehicle of claim 9, wherein the first cooler is configured to pivot relative to the second cooler and the air propelling member.

11. The vehicle of claim 9, further including a third cooler mounted on a third wall that defines a third plane, the third plane being perpendicular to the first and second planes.

12. The vehicle of claim 9, wherein the air propelling member is mounted within a shroud in a fourth wall that defines an air propelling aperture such that a line perpendicular to the first plane passes through the fan aperture and the first cooler.

13. The vehicle of claim 12, wherein a line perpendicular to the second plane passes through the fan aperture and the second cooler.

14. The vehicle of claim 9, further comprising third, fourth, fifth, and sixth walls cooperating with the first and second walls to define an interior volume, wherein the fourth wall has a perimeter differently sized than the first, second, third, fifth, and sixth walls.

15. A method of assembling a cooling system on a vehicle, the method including the steps of:
    assembling six planar walls where first and second walls define planes that intersect, third and fourth walls are parallel to each other, and fifth and sixth walls are parallel to each other, the six walls cooperating to define an interior volume;
    positioning first and second heat exchangers on the first and second walls; and
    coupling a fan to one of the walls.

16. The method of claim 15, further including a third heat exchanger located on the third wall.

17. The method of claim 16, wherein the fan is coupled to the fifth wall.

18. The method of claim 17, wherein the fifth wall includes a shroud within which the fan is disposed.

* * * * *